T. JOYCE.
Safety-Guards for Wagons and Carriages.

No. 157,837.  Patented Dec. 15, 1874.

WITNESSES:
A. W. Almqvist
A. F. Terry

INVENTOR:
Thomas Joyce
BY
ATTORNEYS.

UNITED STATES PATENT OFFICE.

THOMAS JOYCE, OF NEW YORK, N. Y.

IMPROVEMENT IN SAFETY-GUARDS FOR WAGONS AND CARRIAGES.

Specification forming part of Letters Patent No. 157,837, dated December 15, 1874; application filed November 14, 1874.

*To all whom it may concern:*

Figure 1:
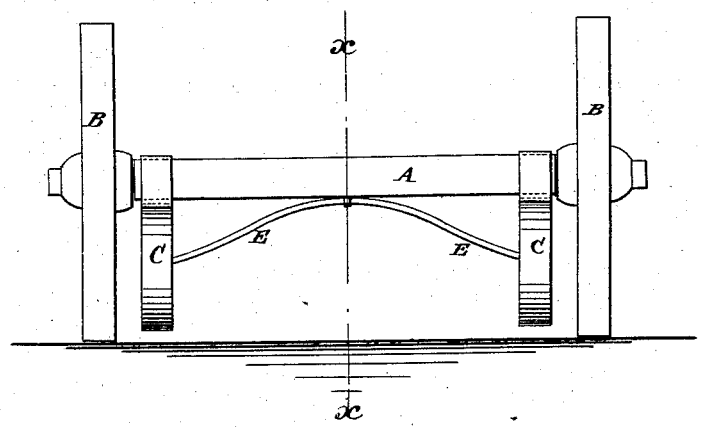
Figure 2:
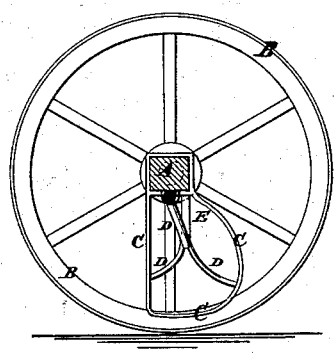

Be it known that I, THOMAS JOYCE, of the city, county, and State of New York, have invented a new and useful Improvement in Running-Gear for Wagons, of which the following is a specification:

Figure 1 is a front view of an axle to which my improvement has been applied; and Fig. 2 is a cross-section of the same taken through the line $x$ $x$, Fig. 1.

Similar letters of reference indicate corresponding parts.

My invention has for its object to furnish an improved device for attachment to wagons, carriages, and other wheeled vehicles, to prevent them being farther broken, and the persons in them from being injured, should the axle be accidentally broken while the vehicle is being used.

My invention consists in the guards attached to the axle of a vehicle at the inner side of the wheels, and in the combination of braces with the guard and with the axle to which said guards are attached, as hereinafter fully described.

A represents an axle, and B the wheels, of a wagon, about the construction of which parts there is nothing new. To the axle A, near each hub, is attached a guard, C, the rear arm of which may be vertical, inclined, or curved, and its forward arm should be curved, so that it may readily pass over obstructions, should it encounter any, or should it be drawn along the ground. The ends of the guard C are bolted to the axle A, or secured to it by a clip or other fastening. The guard C is kept from being crushed inward by braces D, the lower ends of which are secured to its lower part, and their upper ends are secured to the axle A or to the fastening by which the guard C is secured to said axle. The guard C is secured against being pushed inward laterally by braces E, the outer ends of which are secured to the braces D, and their inner ends are secured to the middle part of the axle A.

With this construction, should the axle break or a wheel be crushed in, or otherwise break down, the guards C will come in contact with the ground and slide along it, preventing the wagon-body from dropping so low as to throw out those riding in it, and enabling the wagon to be drawn home or to the repair-shop without trouble and without danger of farther breakage.

Having thus described my invention, I claim as new and desire to secure by Letters Patent—

1. The guard C, attached to the axle of a vehicle at the inner side of the wheels, substantially as shown and described.

2. The combination of braces D E with the guards C, and the axle to which said guards are attached, substantially as shown and described.

THOMAS JOYCE.

Witnesses:
JAMES T. GRAHAM,
T. B. MOSHER.